(12) United States Patent
Ito et al.

(10) Patent No.: US 12,135,220 B2
(45) Date of Patent: Nov. 5, 2024

(54) POWER TRANSMISSION DEVICE, NON-CONTACT POWER TRANSMISSION SYSTEM, AND METHOD FOR CONTROLLING POWER TRANSMISSION DEVICE

(71) Applicant: TOYOTA JIDOSHA KABUSHIKI KAISHA, Toyota (JP)

(72) Inventors: Masaki Ito, Toyota (JP); Akihiro Kusumoto, Susono (JP); Takahiro Hirano, Gotemba (JP); Ryunosuke Yamashita, Susono (JP); Daiki Tajima, Miyoshi (JP); Katsuya Kobayashi, Okazaki (JP); Toshihiro Nakamura, Sunto-gun (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 161 days.

(21) Appl. No.: 17/964,126

(22) Filed: Oct. 12, 2022

(65) Prior Publication Data

US 2024/0167835 A1    May 23, 2024

(30) Foreign Application Priority Data

Dec. 7, 2021  (JP) ................. 2021-198555

(51) Int. Cl.
| | |
|---|---|
| *G01C 21/36* | (2006.01) |
| *B60L 53/12* | (2019.01) |
| *G08G 1/0962* | (2006.01) |
| *H02J 50/10* | (2016.01) |
| *H02J 50/40* | (2016.01) |
| *H02J 50/90* | (2016.01) |

(52) U.S. Cl.
CPC .......... *G01C 21/3632* (2013.01); *B60L 53/12* (2019.02); *G01C 21/365* (2013.01); *G08G 1/0962* (2013.01); *H02J 50/10* (2016.02); *H02J 50/402* (2020.01); *H02J 50/90* (2016.02)

(58) Field of Classification Search
CPC ... G01C 21/3632; G01C 21/365; H02J 50/90; H02J 50/10; H02J 50/402; B60L 53/12; G08G 1/0962
USPC ....................................... 340/901
See application file for complete search history.

(56) References Cited

U.S. PATENT DOCUMENTS

| | | | | |
|---|---|---|---|---|
| 2015/0217655 A1* | 8/2015 | Sankaran | ................ | B60L 53/39 180/65.21 |
| 2016/0332572 A1* | 11/2016 | Gibeau | .............. | B62D 15/0275 |
| 2020/0180447 A1* | 6/2020 | Nishimura | .............. | H02J 50/80 |

(Continued)

FOREIGN PATENT DOCUMENTS

| | | | | |
|---|---|---|---|---|
| CN | 115091976 A | * | 9/2022 | |
| JP | 2020-010451 A | | 1/2020 | |
| WO | WO-2019068516 A1 | * | 4/2019 | ................ B60S 3/04 |

*Primary Examiner* — Kam Wan Ma
(74) *Attorney, Agent, or Firm* — Oliff PLC

(57) ABSTRACT

A power supply system includes a plurality of power transmission coils, a display layer, and a controller. The power transmission coils are arranged in a predetermined direction on a road and configured to transmit electric power in a non-contact manner to a power receiving coil mounted on a vehicle. The display layer is provided above the power transmission coils. The controller controls a display mode of the display layer so as to guide the vehicle in accordance with a traveling state of the vehicle.

9 Claims, 11 Drawing Sheets

(56) References Cited

U.S. PATENT DOCUMENTS

2023/0264581 A1* 8/2023 Niizuma .................. H02J 50/12
307/104

* cited by examiner

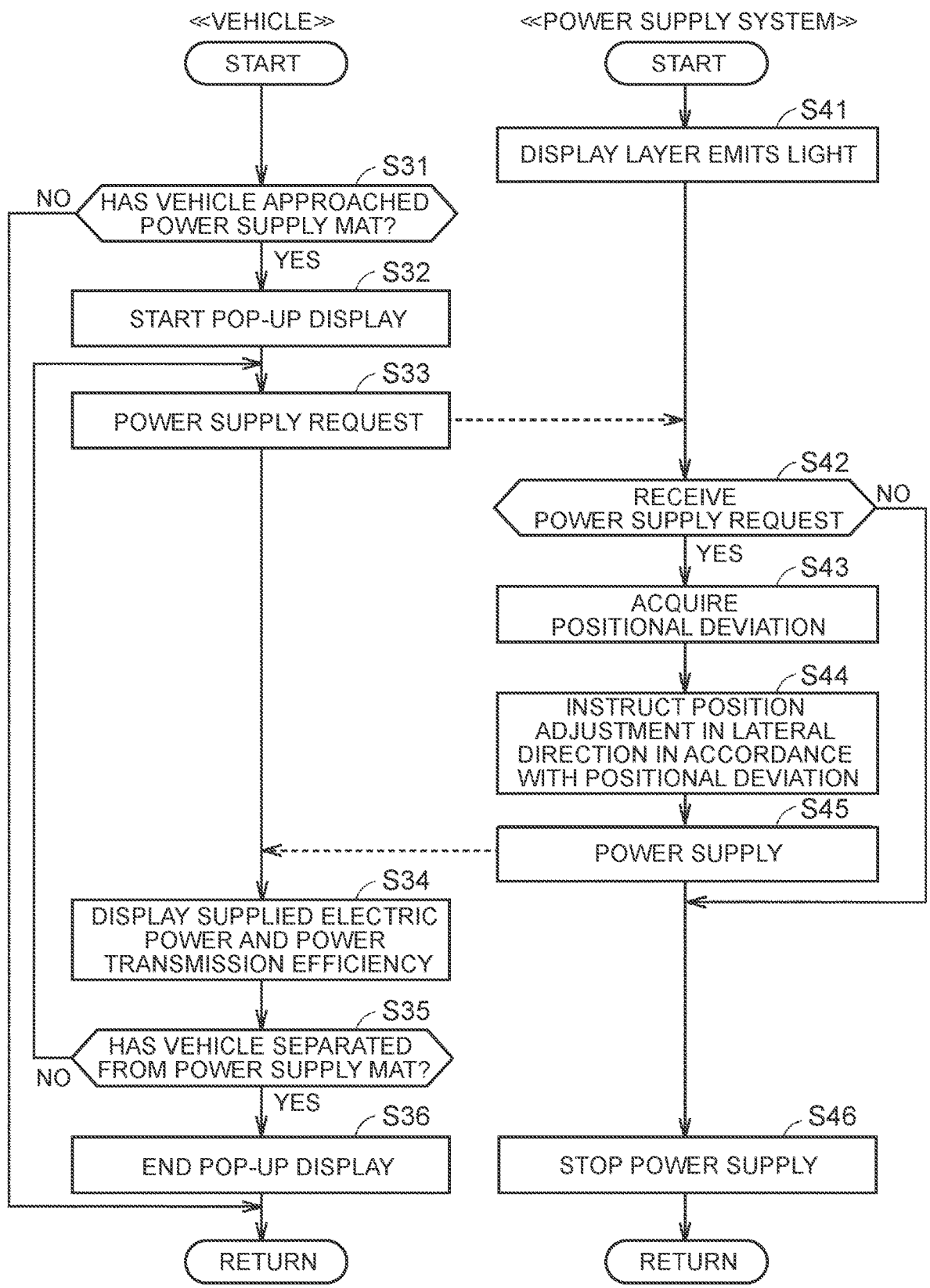

POWER TRANSMISSION DEVICE, NON-CONTACT POWER TRANSMISSION SYSTEM, AND METHOD FOR CONTROLLING POWER TRANSMISSION DEVICE

CROSS-REFERENCE TO RELATED APPLICATION

This application claims priority to Japanese Patent Application No. 2021-198555 filed on Dec. 7, 2021, incorporated herein by reference in its entirety.

BACKGROUND

1. Technical Field

The present disclosure relates to a power transmission device, a non-contact power transmission system, and a technique for transmitting electric power in a non-contact manner to a power receiving coil mounted on a vehicle.

2. Description of Related Art

A vehicle disclosed in Japanese Unexamined Patent Application Publication No. 2020-10451 (JP 2020-10451 A) includes a power receiving device. The power receiving device is mounted on the lower part of the vehicle and is configured to be able to receive electric power in a non-contact manner (wireless charging) from a power transmission device embedded in the road surface.

SUMMARY

In the non-contact power transmission system, electric power can be transmitted even while the vehicle is traveling. In order to realize effective power transmission, it is desirable that the vehicle travels appropriately on the power transmission device. However, the vehicle may not be able to drive appropriately on the power transmission device depending on the driver (for example, a driver with low driving skill), the environment (for example, a dim time zone), etc.

The present disclosure has been made to solve the above issue, and an object of the present disclosure is to enable a vehicle to travel appropriately on a power transmission device.

(1) A power transmission device according to an aspect of the present disclosure includes a plurality of power transmission coils, a display unit, and a control unit. The power transmission coils are arranged in a predetermined direction on a road and configured to transmit electric power in a non-contact manner to a power receiving coil mounted on a vehicle. The display unit is provided above the power transmission coils. The control unit controls the display unit. The control unit controls a display mode of the display unit so as to guide the vehicle in accordance with a traveling state of the vehicle.

(2) When a traveling speed of the vehicle is slower than a specified speed of the road, the control unit controls the display unit such that the display unit emits light in a light emission pattern flowing in a traveling direction of the road on which the power transmission coils are installed. (3) The control unit increases a speed at which the light emission pattern flows as the traveling speed of the vehicle is slower.

In the configuration of (1) above, the vehicle is guided by the display mode of the display unit in accordance with the traveling state of the vehicle. For example, in the configurations (2) and (3) above, when the traveling speed of the vehicle is slower than the specified speed of the road, the display unit emits light in a light emission pattern flowing in the traveling direction of the road. Accordingly, the acceleration of the vehicle can be promoted and the vehicle can be caused to travel at an appropriate speed. As a result, traffic congestion can be suppressed.

(4) The control unit controls the display unit such that the display unit displays an icon or a message for moving the vehicle to the left when the vehicle is traveling with the power receiving coil deviated to the right with respect to the power transmission coils, and controls the display unit such that the display unit displays an icon or a message for moving the vehicle to the right when the vehicle is traveling with the power receiving coil deviated to the left with respect to the power transmission coils.

(5) The control unit controls the display unit such that the display unit emits light in a first light emission color in a section where a traveling position of the vehicle is maintained on the power transmission coils, and controls the display unit such that the display unit emits light in a second light emission color different from the first light emission color in a section where the traveling position of the vehicle deviates from the power transmission coils.

If the power receiving coil is deviated with respect to the power transmission coils, the efficiency of power transmission from the power transmission device to the vehicle may decrease. In the configurations (4) and (5) above, the positional deviation of the power receiving coil with respect to the power transmission coils can be suppressed. As a result, the efficiency of the power transmission can be improved.

(6) A non-contact power transmission system according to another aspect of the present disclosure includes the above-mentioned power transmission device and the vehicle. (7) The vehicle includes a display device that provides information to a driver of the vehicle, and a control device that controls the display device. The control device controls the display device such that the display device displays a notification for adjusting a traveling position of the vehicle. (8) The notification includes an icon for improving efficiency of power transmission from the power transmission coils to the power receiving coil. (9) The display device includes a head-up display. The control device controls the head-up display such that the head-up display displays the notification when the vehicle approaches the power transmission device within a predetermined distance.

According to the configurations (6) to (9) above, a display device such as a head-up display mounted on the vehicle can also give a notification for adjusting the traveling position of the vehicle to guide the vehicle.

(10) In a method for controlling a power transmission device according to still another aspect of the present disclosure, the power transmission device includes a plurality of power transmission coils configured to transmit electric power in a non-contact manner to a power receiving coil mounted on a vehicle. The control method includes detecting a traveling state of the vehicle, and guiding the vehicle by changing a display mode of a display unit provided above the power transmission coils, in accordance with the traveling state of the vehicle.

According to the method (10) above, the vehicle can appropriately travel on the power transmission device as in the configuration of (1) above.

According to the present disclosure, the vehicle can travel appropriately on the power transmission device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 8 is a flowchart showing a processing procedure of a vehicle guidance process according to the second embodiment;

DETAILED DESCRIPTION OF EMBODIMENTS

Figure 1:
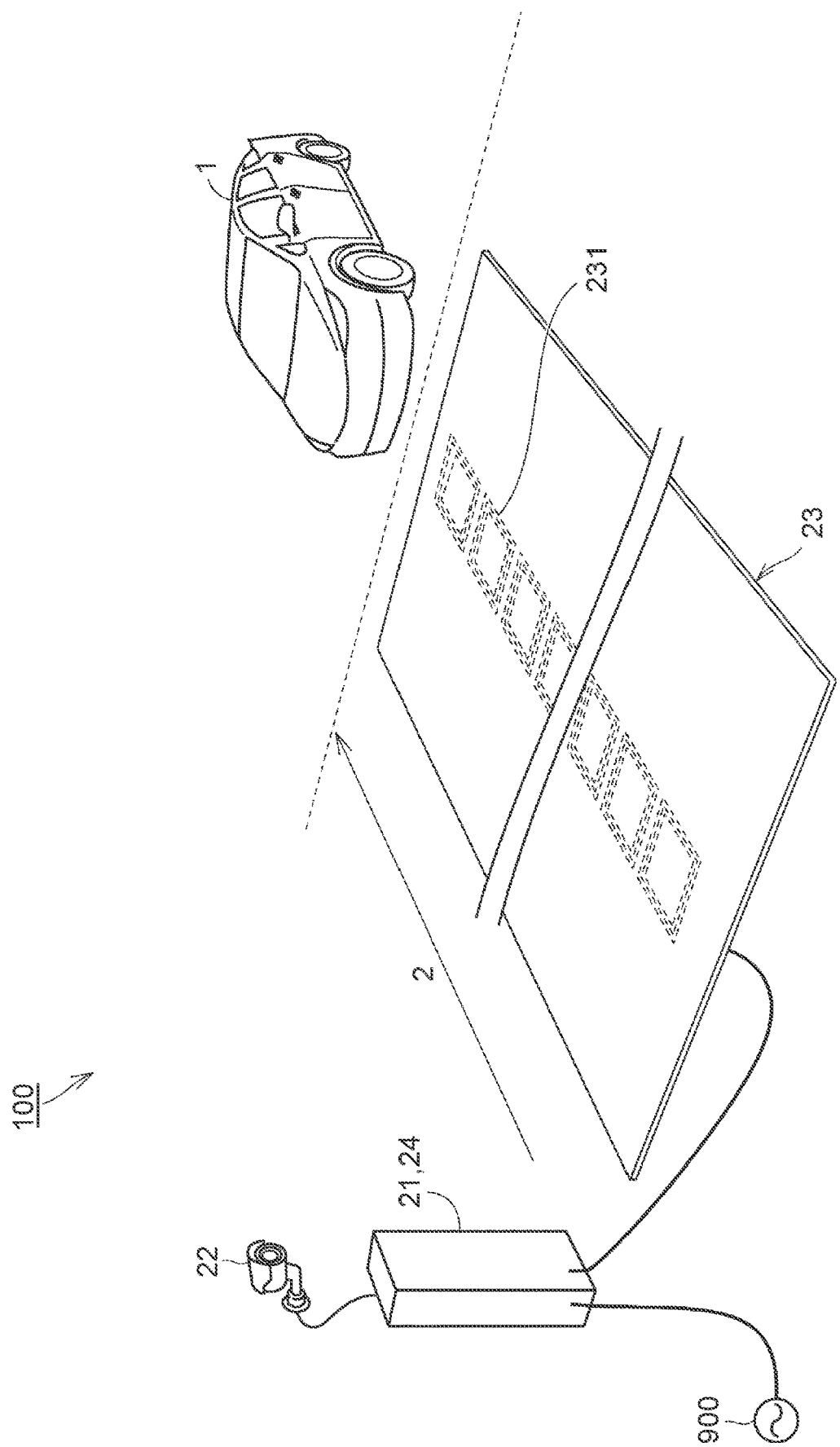
FIG. 1 is a perspective view schematically showing an overall configuration of a non-contact charging system according to an embodiment of the present disclosure.

Hereinafter, embodiments of the present disclosure will be described in detail with reference to the drawings. In the drawings, the same or corresponding portions are denoted by the same reference signs and the description thereof will not be repeated.

First Embodiment

Overall Configuration of System

FIG. 1 is a perspective view schematically showing an overall configuration of a non-contact charging system according to an embodiment of the present disclosure. A non-contact charging system 100 includes a vehicle 1 and a power supply system 2.

The vehicle 1 is configured to receive electric power (power supply) from the outside and charge a vehicle-mounted battery 11 (see FIG. 3) with the electric power. The vehicle 1 is, for example, a hybrid electric vehicle (HEV), a plug-in hybrid electric vehicle (PHEV), or a battery electric vehicle (BEV).

The power supply system 2 is configured to be able to transmit electric power to the vehicle 1 in a non-contact manner. The power supply system 2 includes a power conversion device 21, a sensor unit 22, a power supply mat 23, and a controller 24. The power supply system 2 corresponds to the "power transmission device" according to the present disclosure.

The power conversion device 21 supplies electric power to the power supply mat 23 under the control of the controller 24. The power conversion device 21 is connected to an external alternating current (AC) power supply (for example, a commercial power supply) 900. The power conversion device 21 converts the voltage of the AC power supplied from the AC power supply 900 into an appropriate value, and supplies the AC power after the voltage conversion to the power supply mat 23. Although FIG. 1 shows an example in which the power conversion device 21 is exposed on the ground, the power conversion device 21 may be buried in the ground.

The sensor unit 22 detects the position of the vehicle 1 passing over the power supply mat 23, and outputs a signal indicating the detection result to the controller 24. The sensor unit 22 is, for example, an optical sensor and includes at least one of a camera, a radar sensor, and a laser imaging detection and ranging (LIDAR) sensor. However, the detection method of the vehicle 1 by the sensor unit 22 is not particularly limited. The sensor unit 22 may be, for example, a weight sensor that detects the weight of the vehicle 1.

The power supply mat 23 is configured to be able to transmit electric power to the vehicle 1 in a non-contact manner. The power supply mat 23 has a mat shape and is installed on a road surface (on the road). The power supply mat 23 may be configured to be movable (portable) and may have flexibility allowing the power supply mat 23 to be rolled into a roll shape. Instead of the movable power supply mat 23, it is also possible to adopt a device fixed to the road surface. The configuration of the power supply mat 23 will be described with reference to FIG. 2.

The controller 24 identifies the traveling position and the traveling speed of the vehicle 1 based on a signal from the sensor unit 22. The controller 24 controls the power conversion device 21 and the power supply mat 23 so as to supply AC power to the vehicle 1.

The controller 24 is configured to be able to communicate with the vehicle 1. The controller 24 may acquire the traveling position and the traveling speed of the vehicle 1 from the vehicle 1 by communicating with the vehicle 1. In the example shown in FIG. 1, the controller 24 is arranged in the same housing as the power conversion device 21, but the controller 24 may be arranged apart from the power conversion device 21. Further, the controller 24 may be arranged in an external server to control the power conversion device 21 by wireless communication. The controller 24 corresponds to the "control unit" according to the present disclosure.

Figure 2:
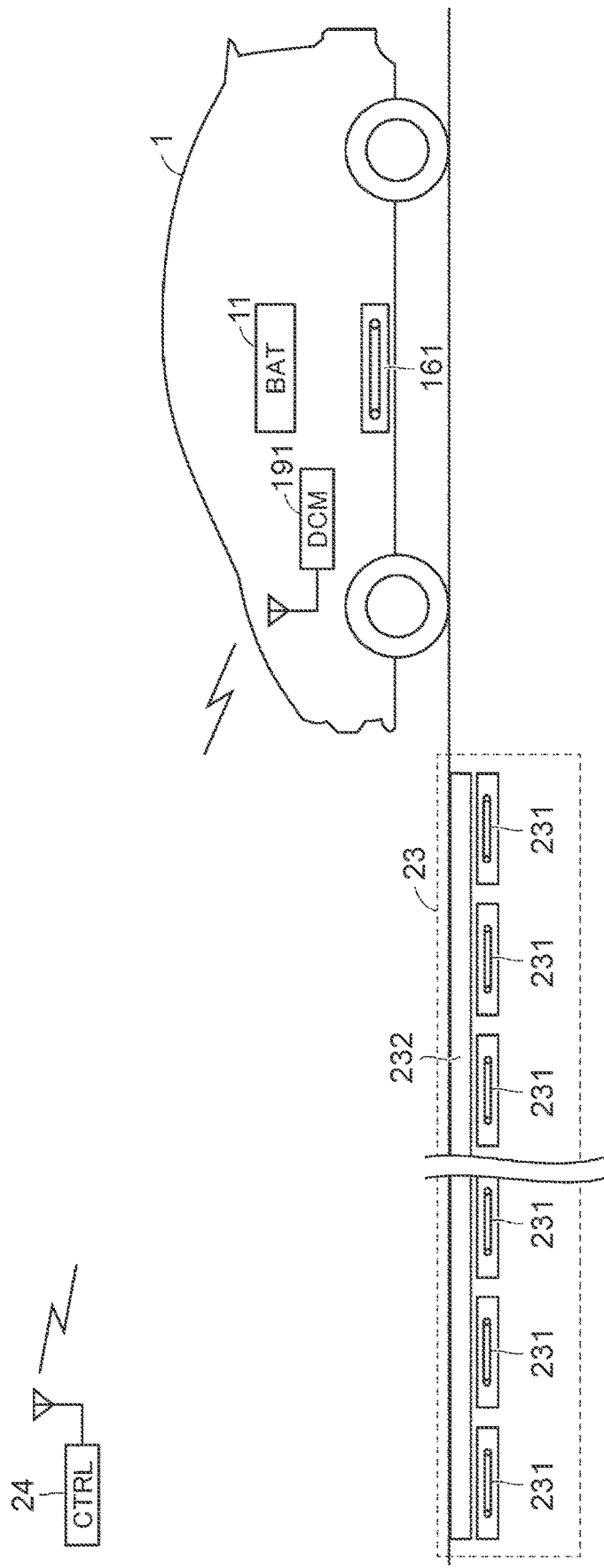
FIG. 2 is a diagram illustrating a state of power transmission from a power supply mat to a vehicle.

FIG. 2 is a diagram illustrating a state of power transmission from the power supply mat 23 to the vehicle 1. The power supply mat 23 includes a plurality of power transmission coils 231 and a display layer 232.

The power transmission coils 231 are arranged in a row on the road surface. Each of the power transmission coils 231 may be formed in a square shape in a plan view as shown in FIG. 1 or may be formed in a hexagonal shape in a plan view. Alternatively, each power transmission coil 231 may be formed in a shape (for example, a solenoid shape) different from the square shape and the hexagonal shape in a plan view.

When the vehicle 1 is detected above a certain power transmission coil 231 of the plurality of the power transmission coils 231, the controller 24 supplies AC power to the power transmission coil 231. Accordingly, an alternating current flows through the power transmission coil 231, which forms an electromagnetic field around the power transmission coil 231. The power receiving coil 161 in the power receiving device mounted on the vehicle 1 receives electric power in a non-contact manner through the electromagnetic field. Subsequently, when the vehicle 1 is no longer detected above the power transmission coil 231, the controller 24 stops supplying AC power to the power transmission coil 231. By performing such a series of control for each power transmission coil 231 arranged in a row, electric power can be transmitted to the traveling vehicle 1 in a non-contact manner. As a result, the battery 11 mounted on the vehicle 1 can be charged.

The display layer 232 is provided above (on the upper surface of) the power transmission coils 231. The display layer 232 includes a light emitting element such as a light emitting diode (LED). The display layer 232 may include a display such as a liquid crystal display. The display layer 232 displays a predetermined image (icon or message) in a manner visible to the driver of the vehicle 1 under the control of the controller 24. More specifically, the display layer 232 displays an image for guiding the vehicle 1. This process is referred to as "vehicle guidance process" and will be described in detail later. The display layer 232 corresponds to the "display unit" according to the present disclosure.

Vehicle Configuration

Figure 3:
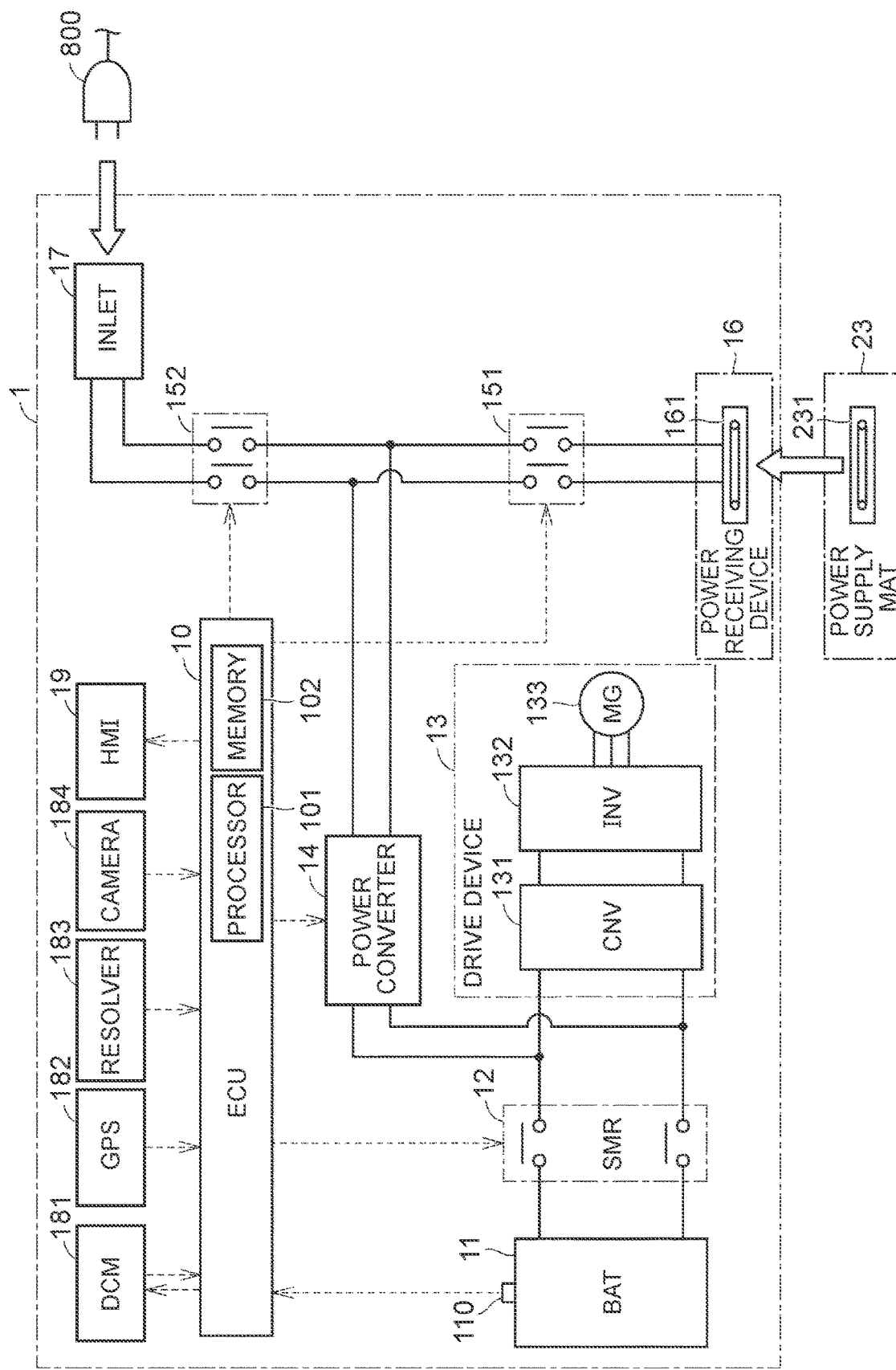
FIG. 3 is a block diagram showing a typical hardware configuration of the vehicle.

FIG. 3 is a block diagram showing a typical hardware configuration of the vehicle 1. The vehicle 1 is a battery electric vehicle in this example. The vehicle 1 includes a battery 11, a system main relay (SMR) 12, a drive device 13, a power converter 14, charging relays 151, 152, a power receiving device 16, an inlet 17, a communication module 181, a global positioning system (GPS) receiver 182, a resolver 183, a camera 184, a human-machine interface (HMI) 19, and an electronic control unit (ECU) 10.

The battery 11 supplies electric power for generating the driving force of the vehicle 1 to the drive device 13. Further, the battery 11 stores the charging power supplied from the outside and also stores the regenerative power generated by the drive device 13. The battery 11 is an assembled battery including a plurality of cells (not shown). Each cell is a secondary battery such as a lithium ion battery or a nickel hydrogen battery.

The battery 11 is provided with a monitoring unit 110. Although not shown, the monitoring unit 110 includes a voltage sensor, a current sensor, and a temperature sensor. The voltage sensor detects the voltage of the battery 11. The current sensor detects the current input to and output from the battery 11. The temperature sensor detects the temperature of the battery 11. Each sensor outputs the detection result to the ECU 10.

The SMR 12 is electrically connected between the battery 11 and the drive device 13. The SMR 12 is closed/opened in response to a control command from the ECU 10.

The drive device 13 is electrically connected to the SMR 12. The drive device 13 includes a converter 131, an inverter 132, and a motor generator 133.

The converter 131 boosts the direct current (DC) power of the battery 11. The inverter 132 converts the DC power boosted by the converter 131 into AC power and outputs the AC power to the motor generator 133. The motor generator 133 is driven by using electric power from the battery 11. The driving force of the motor generator 133 is transmitted to the driving wheels. In situations such as when the vehicle 1 is braking and the acceleration is reduced on a downhill slope, the motor generator 133 performs regenerative power generation. The electric power generated by the motor generator 133 is supplied to the battery 11 via the inverter 132 and the converter 131.

The power converter 14 is, for example, an AC/DC converter. The power converter 14 converts the AC power supplied from the charging equipment via the charging cable into DC power for charging the battery 11. Further, the power converter 14 converts the AC power supplied from the power supply mat 23 via the power receiving device into DC power for charging the battery 11.

The charging relay 151 is electrically connected between the power receiving device 16 and the power converter 14. The charging relay 151 is closed/opened in response to a control command from the ECU 10. When the charging relay 151 is closed and the SMR 12 is closed, electric power can be transmitted between the power receiving device 16 and the battery 11.

The charging relay 152 is electrically connected between the inlet 17 and the power converter 14. The charging relay 152 is closed/opened in response to a control command from the ECU 10. When the charging relay 152 is closed and the SMR 12 is closed, electric power can be transmitted between the inlet 17 and the battery 11.

The power receiving device 16 is disposed, for example, on the lower surface of the floor panel forming the bottom surface of the vehicle 1 (see FIG. 2). The power receiving device 16 includes the power receiving coil 161. The power receiving coil 161 receives electric power transmitted from the power transmission coils 231 in the power supply mat 23 in a non-contact manner.

The inlet 17 is configured so that a charging connector 800 of the charging equipment (not shown) is electrically connected during plug-in charging.

The communication module 181 is a digital communication module (DCM) configured to enable bidirectional communication with the power supply system 2. The GPS receiver 182 identifies the current position of the vehicle 1 based on radio waves transmitted from an artificial satellite (not shown). The resolver 183 detects the traveling speed (vehicle speed) of the vehicle 1. The camera 184 captures an image ahead of the vehicle 1.

The HMI 19 accepts user operations. The HMI 19 also presents various types of information to the user. The HMI 19 corresponds to the "display device" according to the present disclosure.

The ECU 10 includes a processor 101, a memory 102, and an input/output port (not shown). The ECU 10 controls the devices in accordance with the signals from the sensors and the like so that the vehicle 1 is in a desired state. The ECU 10 may be divided into a plurality of ECUs for each function. The ECU 10 corresponds to the "control device" according to the present disclosure.

Figure 4:
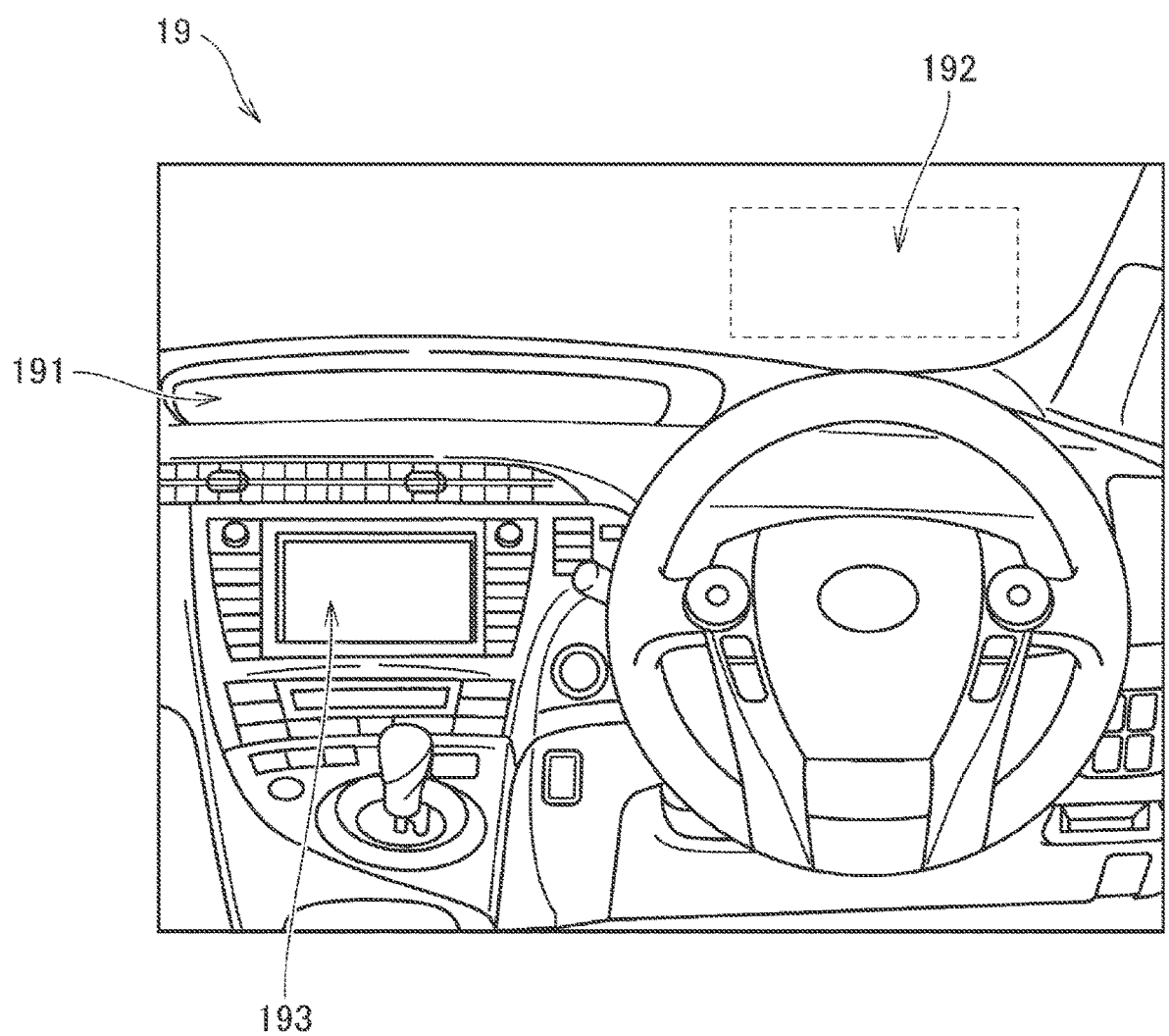
FIG. 4 is a diagram showing a configuration example of a human-machine interface (HMI)

FIG. 4 is a diagram showing a configuration example of the HMI 19. The HMI 19 includes an instrument panel 191, a head-up display (HUD) 192, and a navigation screen 193.

The instrument panel 191 is an instrument panel on which meters are installed, and displays various states of the vehicle 1 in accordance with control signals from the ECU 10. Specifically, the instrument panel 191 displays a speedometer, a trip meter, a state of charge (SOC) of the battery 11, warning lights, and the like. A multi-information display (MID) may be adopted instead of the instrument panel 191.

The HUD 192 projects various types of information as a virtual image ahead of the driver's field of view. Specifically, the HUD 192 displays the vehicle speed of the vehicle 1, the traveling direction toward the destination, traffic signs, and the like.

The navigation screen 193 is a display of a navigation system (not shown). The navigation system displays the current location of the vehicle 1 and the recommended route toward the destination of the vehicle 1 on the navigation screen 193 based on the GPS data of the vehicle 1 and the road map data.

Hereinafter, an example in which various types of information regarding the power supply mat 23 is displayed on the HUD 192 will be described. However, the information may be displayed on the instrument panel 191 or on the navigation screen 193 in place of or in addition to the HUD 192.

Vehicle Guidance Process

Figure 5:
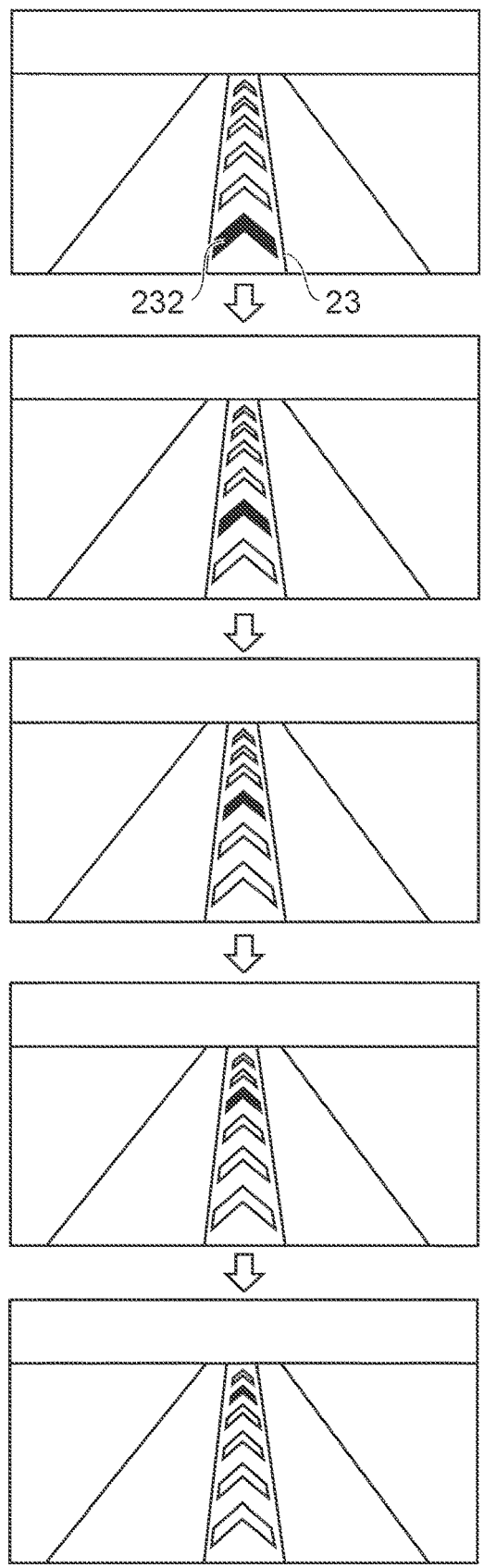
FIG. 5 is a diagram illustrating a display mode of a display layer of the power supply mat according to a first embodiment.

FIG. 5 is a diagram illustrating a display mode of the display layer 232 of the power supply mat 23 according to the first embodiment. The display layer 232 emits light in a light emission pattern that flows in the traveling direction of the road (traveling direction of the vehicle 1). The light emission pattern of the example shown in FIG. 5 is a pattern that looks like an arrow flows to the human eye due to the arrows emitting light sequentially along the traveling direction of the road (in FIG. 5, from the front toward the back).

The visibility of the power supply mat 23 may decrease depending on the environment, such as at night, during rain, or in a tunnel. In this case, if the display layer 232 is not provided, it may be difficult for the driver of the vehicle 1 to recognize whether the vehicle 1 is appropriately traveling on the power supply mat 23. Since the display layer 232 emits light along the traveling direction of the road, the driver can easily recognize the route on the power supply mat 23 on which the vehicle 1 should travel.

In addition to that, when the amount of electric power stored in the battery 11 is relatively small, electric power is received from the power supply mat 23 for as long as possible, which makes it conceivable that the vehicle 1 slows down on the power supply mat 23. In this case, the following vehicle also needs to slow down, which may cause traffic congestion. When the traveling speed of the vehicle 1 is slower than the specified speed of the road (for example, the speed limit), acceleration of the vehicle 1 can be promoted by setting the speed at which the light emission pattern of the display layer 232 flows (hereinafter, also referred to as "flow speed") to an appropriate speed. It should be noted that the promotion of acceleration may include the suppression of deceleration.

The flow speed of the light emission pattern can be set in accordance with the traveling speed of the vehicle 1. More specifically, if the flow speed is too slow, the effect of promoting acceleration of the vehicle 1 is small. On the contrary, if the flow speed is too fast, the acceleration of the vehicle 1 can be excessively promoted. It is preferable that the flow speed of the light emission pattern is faster than the vehicle speed and slower than the specified speed of the road. For example, when the specified speed is 60 km/h and the vehicle speed is 40 km/h, the flow speed can be set to 50 km/h. An appropriate acceleration promotion effect can thus be obtained.

Further, it is more preferable that the slower the vehicle speed (the larger the speed difference between the specified speed and the vehicle speed), the faster the flow speed of the light emission pattern. For example, when the specified speed of the road is 60 km/h and the vehicle speed is 30 km/h, the flow speed can be increased as compared with the case where the vehicle speed is 40 km/h. The acceleration promotion effect can thus be enhanced.

Processing Flow

Figure 6:
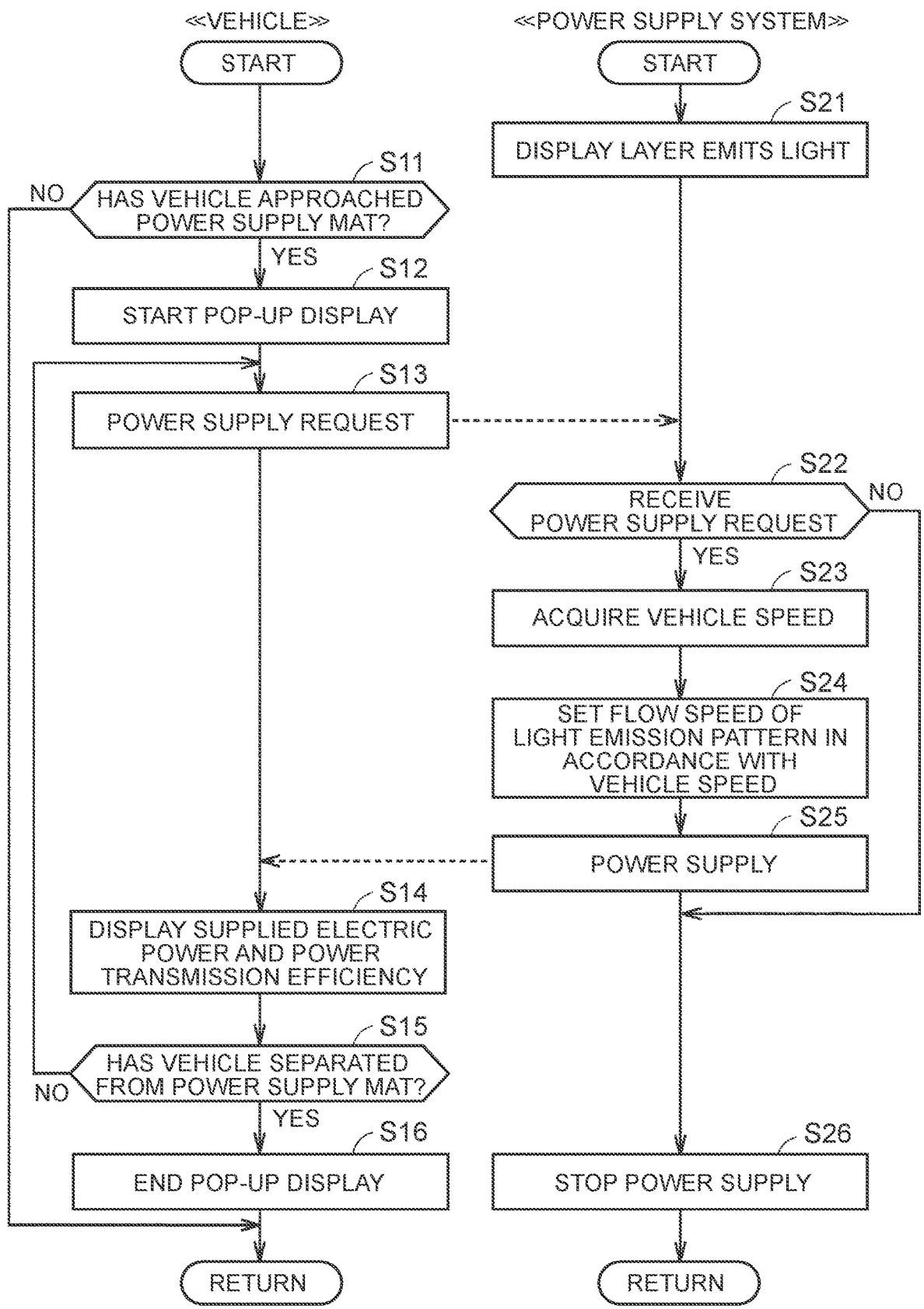
FIG. 6 is a flowchart showing a processing procedure of a vehicle guidance process according to the first embodiment.

FIG. 6 is a flowchart showing a processing procedure of the vehicle guidance process according to the first embodiment. This flowchart is executed, for example, when a predetermined condition is satisfied (at night, during rain, etc.). In FIG. 6, the process executed by the vehicle 1 (ECU 10) is shown on the left side, and the process executed by the power supply system 2 (controller 24) is shown on the right side. Each step is realized by software processing by the ECU 10 or the controller 24, but may be realized by hardware (an electric circuit) provided in the ECU 10 or the controller 24. Hereinafter, the step is abbreviated as S. The same applies to other flowcharts (see FIG. 8) described later.

In S21, the controller 24 controls the display layer 232 of the power supply mat 23 so that all the arrows emit light (that is, all the arrows remain lit). Subsequently, the controller 24 of the power supply system 2 causes the display layer 232 to continue emitting light (either in a fully lit state or in a predetermined light emission pattern) while the above-mentioned predetermined condition is satisfied.

In S11, the ECU 10 determines whether the vehicle 1 has approached the power supply mat 23. For example, the ECU 10 can determine whether the vehicle 1 has approached the power supply mat 23 within a predetermined distance (for example, several tens of meters) by communicating with the power supply mat 23 via the communication module 181. When the position information of the power supply mat 23 is included in the map information, the ECU 10 may determine whether the vehicle 1 has approached the power supply mat 23 based on the position information of the vehicle 1 from the GPS receiver 182. Alternatively, the ECU 10 may determine whether the vehicle 1 has approached the power supply mat 23 based on the image captured by the camera 184.

When the vehicle 1 has approached the power supply mat 23 (YES in S11), the ECU 10 controls the HUD 192 so that the HUD 192 displays information regarding power supply from the power supply mat 23 (S12). It is desirable that this display be realized by a pop-up display. Specifically, the ECU 10 can control the HUD 192 so that the HUD 192 notifies the approach to the power supply mat 23 or shows the way to the power supply mat 23. Further, the ECU 10 can cause the HUD 192 to display a meter for displaying the charging power to the vehicle 1 and the charging efficiency (described later in S14).

For example, when the SOC of the battery 11 is lower than a predetermined value, the ECU 10 controls the communication module 181 so that the communication module 181 transmits a power supply request that requests power supply from the power supply mat 23 to the vehicle 1. The power supply request includes the required electric power to be supplied (a required value of electric power supplied from the power supply mat 23 to the vehicle 1).

When the power supply request is received from the vehicle 1 (YES in S22), the controller 24 acquires the traveling speed (vehicle speed) of the vehicle 1 (S23). The controller 24 can calculate the vehicle speed based on the detection result from the sensor unit 22 (for example, a camera, a radar sensor, or a LIDAR sensor). The controller 24 may acquire the vehicle speed acquired by the resolver 183 from the vehicle 1.

In S24, the controller 24 controls the display layer 232 of the power supply mat 23 so that the arrows emit light sequentially along the traveling direction of the road. At this time, the controller 24 controls the flow speed of the light emission pattern of the power supply mat 23 in accordance with the vehicle speed. As described with reference to FIG. 5, the controller 24 can adjust the flow speed of the light emission pattern to be faster than the vehicle speed and slower than the specified speed of the road (for example, the value set when the power supply mat 23 is installed). Further, the controller 24 can set the flow speed of the light emission pattern faster as the vehicle speed is slower.

While the vehicle 1 is traveling on the power supply mat 23, the controller 24 controls the power conversion device 21 so that the power supply mat 23 supplies electric power to the vehicle 1 in accordance with the required electric power to be supplied which is transmitted from the vehicle 1 (S25).

In S14, the ECU 10 causes the meter on the HUD 192 to display the electric power supplied from the power supply mat 23 (electric power received by the power receiving coil 161) and efficiency of the power transmission. The ECU 10 can use, for example, the ratio of the electric power received by the power receiving coil 161 to the required electric power to be supplied (=received electric power/required electric power to be supplied) as the efficiency of the power transmission. A gauge indicating the efficiency of the power transmission may be displayed on the HUD 192. The higher the efficiency of the power transmission is, the longer the displayed gauge is.

In S15, the ECU 10 determines whether the vehicle 1 has separated from the power supply mat 23. When the vehicle 1 has not separated from the power supply mat 23 (NO in S15), that is, when the vehicle 1 is traveling on the power supply mat 23, the ECU 10 returns the process to S13. Thus, power supply from the power supply mat 23 to the vehicle 1 is continued. During that time, the flow speed of the light emission pattern of the power supply mat 23 is adjusted in accordance with the vehicle speed.

On the other hand, when the vehicle 1 is separated from the power supply mat 23 (YES in S15), that is, when the vehicle 1 is no longer traveling on the power supply mat 23, the ECU 10 advances the process to S16. Then, the pop-up display of the information regarding the power supply from the power supply mat 23 ends (S16). Further, since the controller 24 no longer receives the power supply request from the vehicle 1 (NO in S22), the power supply from the power supply mat 23 to the vehicle 1 is stopped (S26).

As described above, in the first embodiment, the display mode of the display layer 232 of the power supply mat 23 is controlled so as to guide the vehicle 1 in accordance with the traveling state of the vehicle 1. More specifically, when the vehicle speed (an example of the traveling state) is slower than the specified speed of the road, the flow speed of the light emission pattern of the display layer 232 is controlled in accordance with the vehicle speed so as to promote the acceleration of the vehicle 1. Thus, the vehicle 1 can travel on the power supply mat 23 at an appropriate vehicle speed.

Second Embodiment

In the first embodiment, the configuration in which the acceleration of the vehicle 1 is promoted by the light emission pattern of the display layer 232 of the power supply mat 23 has been described. In the second embodiment, a configuration for suppressing the positional deviation of the vehicle 1 in the lateral direction (direction perpendicular to the traveling direction of the road) with respect to the power supply mat 23 through display by the display layer 232 will be described. The configuration of the vehicle and the power supply system in the second embodiment is the same as the configuration of the vehicle 1 and the power supply system 2 in the first embodiment (see FIGS. 1 to 4).

Figure 7A:
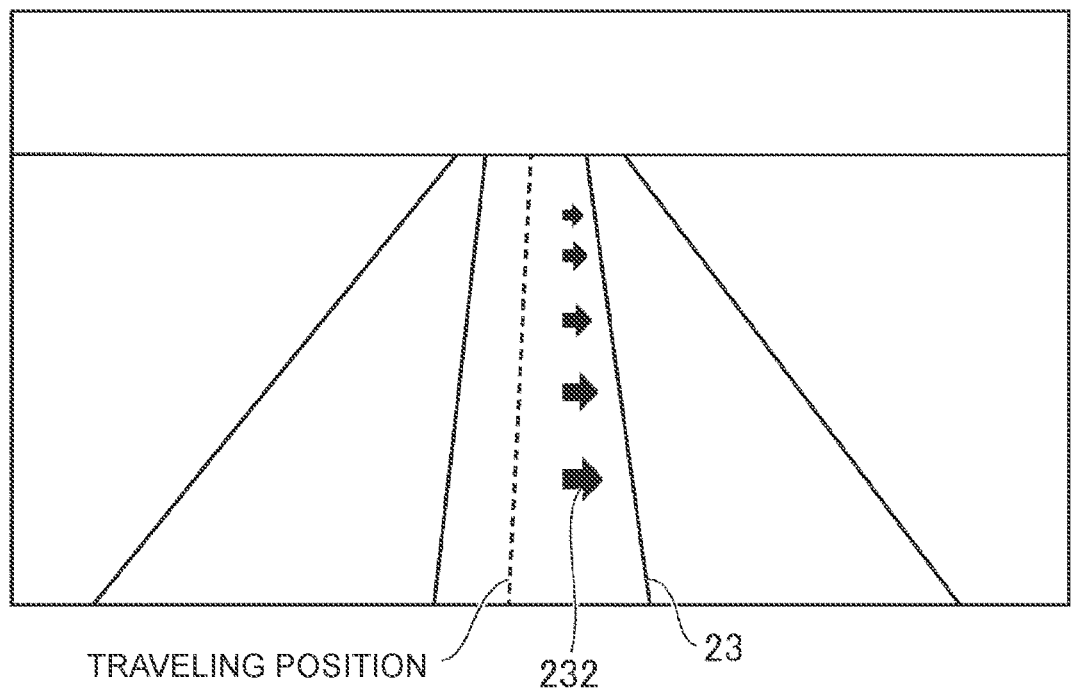
FIG. 7A is a diagram illustrating a display mode of a display layer of a power supply mat according to a second embodiment.
Figure 7B:
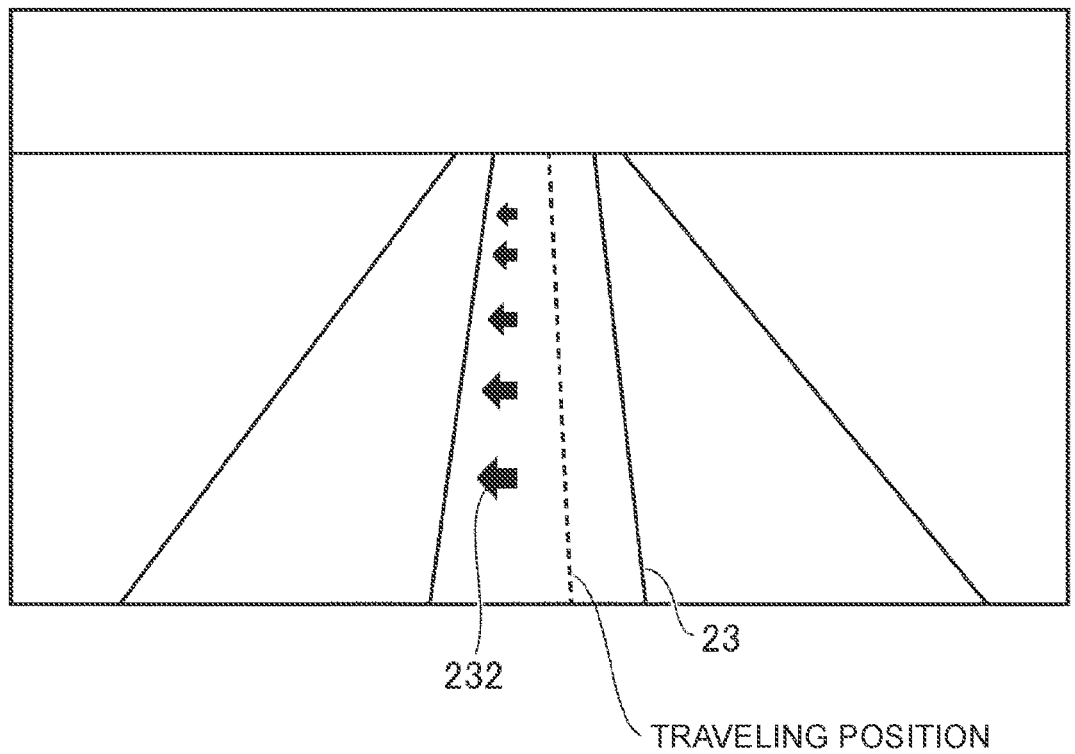
FIG. 7B is a diagram illustrating a display mode of the display layer of the power supply mat according to the second embodiment.

FIGS. 7A, 7B are diagrams illustrating display modes of the display layer 232 of the power supply mat 23 according to the second embodiment. As shown in FIG. 7A, when the vehicle 1 is traveling at a position deviated to the left of the center of the power supply mat 23, the power receiving coil 161 is deviated to the left of the center of the power supply mat 23 (the position of the power transmission coils 231), so that the efficiency of the power transmission from the power transmission coils 231 to the power receiving coil 161 may be lower than that in the case where the power receiving coil 161 is located at the center of the power supply mat 23 (immediately above the power transmission coils 231). Therefore, in the second embodiment, an icon (which may be an animation) or a message (character information) for moving the vehicle 1 to the right is displayed on the display layer 232 of the power supply mat 23. For example, the icon of arrows pointing to the right is displayed on the display layer 232. In place of or in addition to the icon, the message "Move to the right" may be displayed on the display layer 232.

On the contrary, when the vehicle 1 is traveling at a position deviated to the right of the center of the power supply mat 23 (see FIG. 7B), an icon or a message for moving the vehicle 1 to the left is displayed on the display layer 232 of the power supply mat 23. For example, the icon of arrows pointing to the left may be displayed on the display layer 232, or the message "Move to the left" may be displayed on the display layer 232.

It is also possible to combine the display mode in the first embodiment and the display mode in the second embodiment. Specifically, both the arrows for promoting acceleration and the arrows for moving the vehicle to the right or left can be displayed on the display layer 232 of the power supply mat 23. It is also possible to display both the arrows for promoting acceleration and the message "Move to the right" or "Move to the left". Both of the above may be displayed at the same time, or may be displayed one at a time in a predetermined order (for example, alternately).

FIG. 8 is a flowchart showing a processing procedure of the vehicle guidance process according to the second embodiment. This flowchart is different from the flowchart in the first embodiment (see FIG. 6) in that the processes of S43 and S44 are included instead of the processes of S23 and S24. The other processes are the same as the corresponding processes of the flowchart in the first embodiment.

When the power supply request is received from the vehicle 1 (YES in S42), the controller 24 acquires the positional deviation (positional deviation amount and positional deviation direction) of the vehicle 1 with respect to the power supply mat 23 (S43). The controller 24 extracts, for example, the contour of the power supply mat 23 and the contour of the vehicle 1 by known image recognition processing. The controller 24 can calculate the positional deviation of the vehicle 1 based on the relative positional relationship between the two (for example, the distance between the contour of the power supply mat 23 and the contour of the vehicle 1 in the lateral direction of the vehicle 1).

When the positional deviation amount of the vehicle 1 is larger than a specified amount, the controller 24 controls the display layer 232 so that the display layer 232 displays an icon or a message for reducing the positional deviation amount of the vehicle 1 in accordance with the positional deviation direction of the vehicle 1 (S44). Since this process has been described in detail with reference to FIGS. 7A and 7B, the description will not be repeated. When the positional deviation amount of the vehicle 1 is equal to or less than the specified amount, the controller 24 can hide the above icon or message.

In addition to the display on the display layer 232 of the power supply mat 23, it is preferable that the display for reducing the positional deviation amount of the vehicle 1 is also displayed on the HUD 192 of the vehicle 1 (S32). The ECU 10 can cause the HUD 192 to display, for example, a simple accelerometer (G meter).

Figure 9:
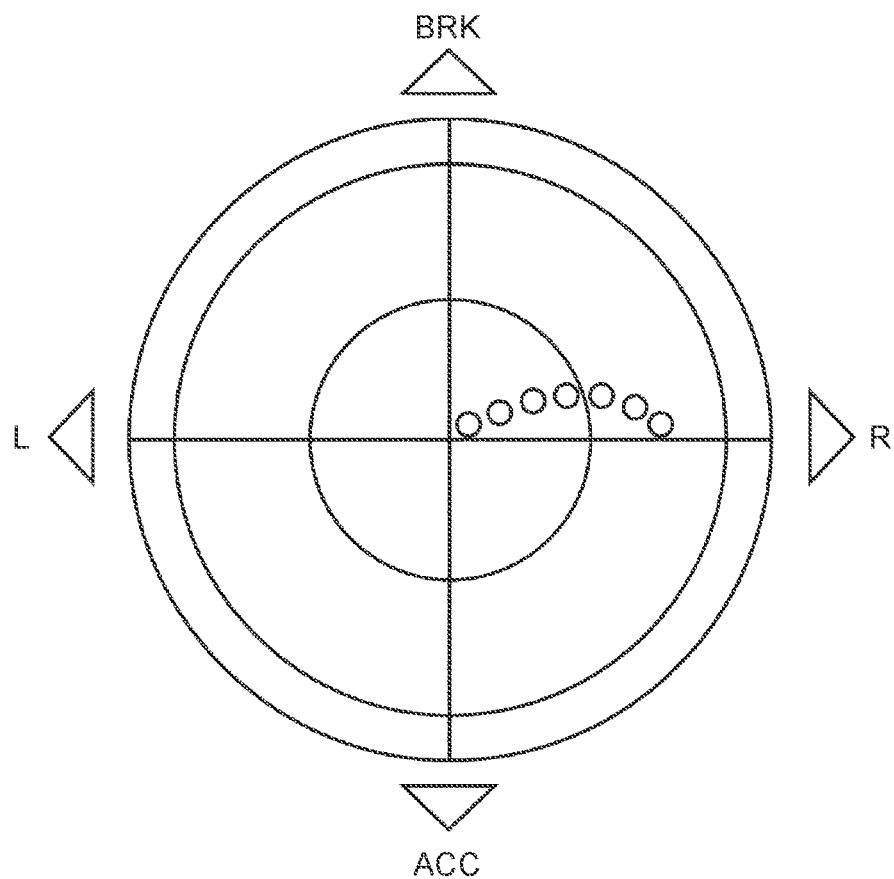
FIG. 9 is a diagram showing an example of a G meter displayed on a head-up display (HUD)

FIG. 9 is a diagram showing an example of the G meter displayed on the HUD 192. The change in the acceleration (G) of the vehicle 1 is indicated by a display in which a ball placed in the center of concentric circles rolls. As an example, when the vehicle 1 is to be moved to the right, an animation of rolling the ball to the right can be displayed on the G meter. As a result, the driver can intuitively understand that it is better to move the vehicle 1 to the right.

As described above, also in the second embodiment, the display mode of the display layer 232 of the power supply mat 23 is controlled so as to guide the vehicle 1 in accordance with the traveling state of the vehicle 1. More specifically, the icon or the message on the display layer 232 is controlled so as to adjust the position of the vehicle 1 in the lateral direction in accordance with the positional deviation amount and the positional deviation direction (an example of the traveling state) of the vehicle 1. Thus, the vehicle 1 can travel at an appropriate position in the lateral direction on the power supply mat 23. As a result, the efficiency of the power transmission from the power supply mat 23 to the power receiving device 16 can be improved.

Third Embodiment

In the third embodiment, a configuration for setting the light emission color of the display layer 232 of the power supply mat 23 in accordance with the positional deviation of the vehicle 1 with respect to the power supply mat 23 will be described. The configuration of the vehicle and the power supply system in the third embodiment is also the same as the configuration of the vehicle 1 and the power supply system 2 in the first embodiment (see FIGS. 1 to 4).

Figure 10A:
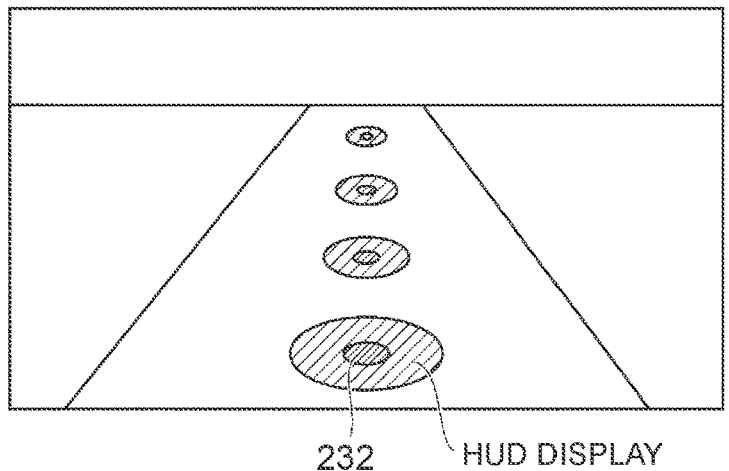
FIG. 10A is a diagram illustrating a display mode of a display layer of a power supply mat according to a third embodiment.
Figure 10B:
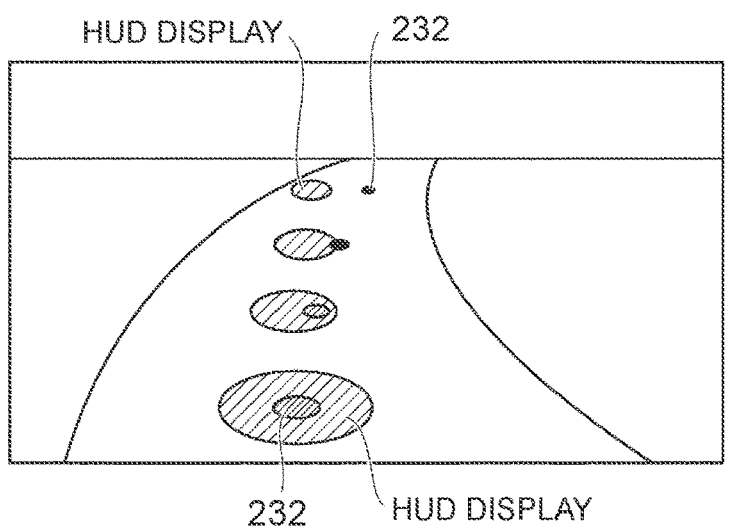
FIG. 10B is a diagram illustrating a display mode of the display layer of the power supply mat according to the third embodiment.
Figure 10C:
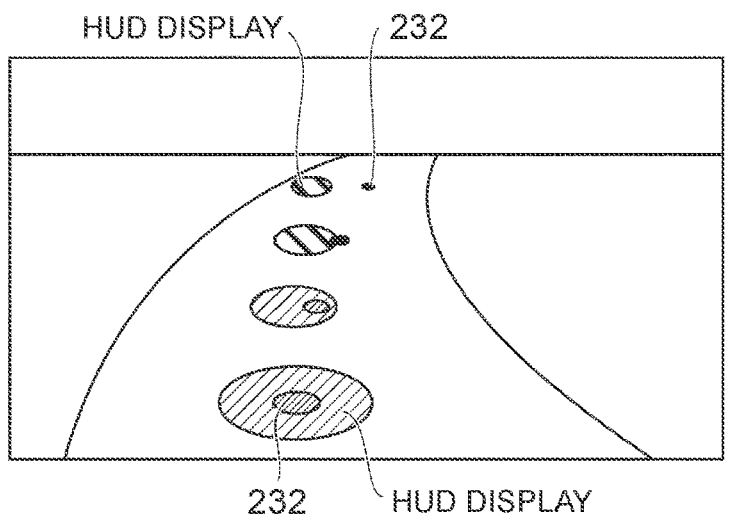
FIG. 10C is a diagram illustrating a display mode of the display layer of the power supply mat according to the third embodiment.

FIGS. 10A to 10C are diagrams illustrating display modes of the display layer 232 of the power supply mat 23 according to the third embodiment. As shown in FIGS. 10A to 10C, the display layer 232 of the power supply mat 23 emits light at predetermined intervals. In this example, the display layer 232 emits light at each position of the power transmission coils 231. On the other hand, in the vehicle 1, the position of the power transmission coils 231 identified by the camera 184 detecting the light emission of the display layer 232 is displayed on the HUD 192. In the third embodiment, the display color of the display layer 232 is changed depending on whether the traveling position of the vehicle 1 is maintained on the power supply mat 23 or the traveling position of the vehicle 1 deviates from the power supply mat 23.

In the example of FIG. 10A, the vehicle 1 is traveling straight. When the vehicle 1 travels as it is without changing the vehicle operation (steering operation, accelerator operation, brake operation, etc.), the traveling position of the vehicle 1 is maintained on the power supply mat 23. In this case, for example, the display layer 232 emits a white light at the positions of the power transmission coils 231. The power transmission coils 231 are displayed in white on the HUD 192.

In the example of FIG. 10B, the vehicle 1 is traveling while turning to the right. When the vehicle 1 travels as it is, the traveling position of the vehicle 1 is maintained on the power supply mat 23 up to the second power transmission coil 231 from the front, but the traveling position of the vehicle 1 deviates from the power supply mat 23 at the third and subsequent power transmission coils 231 from the front. In such a case, in the section where the traveling position of the vehicle 1 is maintained on the power supply mat 23, for example, the display layer 232 emits a white light at the positions of the power transmission coils 231. The power transmission coils 231 are displayed in white on the HUD 192. On the other hand, in the section where the traveling position of the vehicle 1 deviates from the power supply mat 23, for example, the display layer 232 emits a red light at the positions of the power transmission coils 231. The positions of the power transmission coils 231 are displayed in white on the HUD 192.

Although the example in which the display color on the HUD 192 is fixed to white has been described, as shown in FIG. 10C, the display color on the HUD 192 may be changed in addition to the light emission color of the display layer 232. In the section where the traveling position of the vehicle 1 deviates from the power supply mat 23, for example, the display layer 232 may emit a red light at the positions of the power transmission coils 231 and the positions of the power transmission coils 231 may be displayed in red on the HUD 192.

In this way, by changing the light emission color of the display layer 232 of the power supply mat 23 in accordance with the traveling position of the vehicle 1, the driver can easily recognize that a vehicle operation (mainly steering operation) is required to continue the state where the traveling position of the vehicle 1 is on the power supply mat 23. Further, by linking the display on the HUD 192 with the light emission color of the display layer 232, the driver can more easily recognize the necessity of the vehicle operation.

In addition to the light emission color of the display layer 232, the controller 24 of the power supply system 2 may set a light emission pattern (for example, a blinking cycle) in accordance with the traveling position of the vehicle 1. For example, the controller 24 can cause the display layer 232 to be constantly lit in the section where the traveling position of the vehicle 1 is maintained on the power supply mat 23, whereas the controller 24 can cause the display layer 232 to blink in the section where the traveling position of the vehicle 1 deviates from the power supply mat 23.

Figure 11:
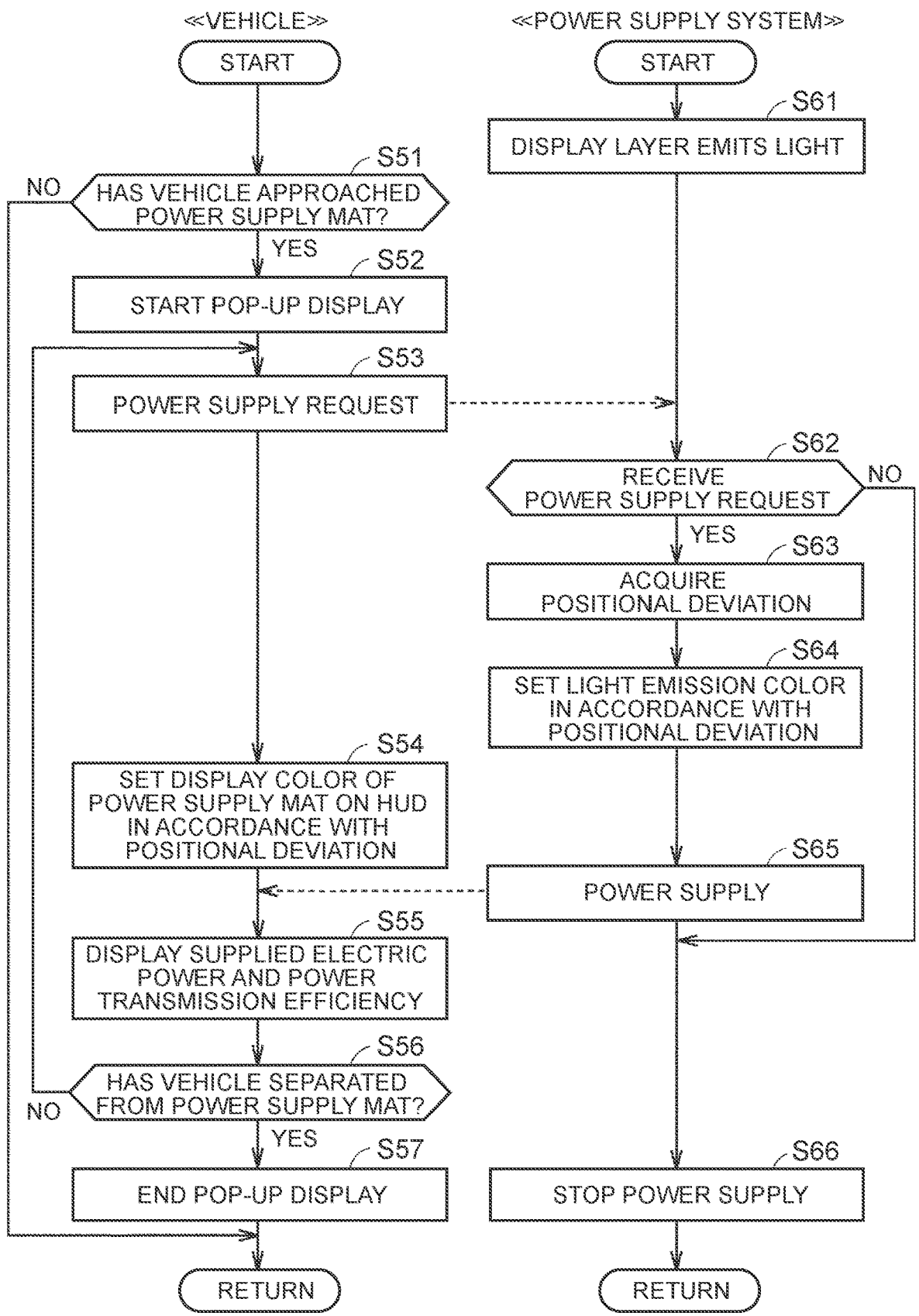
FIG. 11 is a flowchart showing a processing procedure of a vehicle guidance process according to the third embodiment.

FIG. 11 is a flowchart showing a processing procedure of the vehicle guidance process according to the third embodiment. This flowchart is different from the flowchart in the first embodiment (see FIG. 6) in that the processes of S63 and S64 is included instead of the processes of S23 and S24 and the process of S54 is included. The other processes are the same as the corresponding processes of the flowchart in the first embodiment.

When the power supply request is received from the vehicle 1 (YES in S62), the controller 24 acquires the positional deviation (positional deviation amount) of the vehicle 1 with respect to the power supply mat 23 at predetermined intervals (at each position of the power transmission coils 231 in this example) (S63). The controller 24 extracts, for example, a continuous time change of the traveling position of the vehicle 1 in the past (for example, a period from a few seconds ago to the present) by image recognition processing. The controller 24 can predict a continuous time change of the traveling position of the vehicle 1 in the future (for example, a period from the present to a few seconds later) when the operation by the driver is unchanged. Since the position of the power supply mat 23 is known, the positional deviation (positional deviation amount) of the vehicle 1 with respect to the power supply mat 23 can be calculated based on the future traveling position of the vehicle 1 and the position of the power supply mat 23.

However, the method for acquiring the positional deviation of the vehicle 1 with respect to the power supply mat 23 is not particularly limited. The controller 24 can also calculate the positional deviation of the vehicle 1, for example, by acquiring information such as the steering angle, the vehicle speed, and the acceleration of the vehicle 1 by communicating with the vehicle 1. Further, the controller 24 may use the above-mentioned image recognition processing in combination with the information such as the steering angle.

In S64, the controller 24 sets the light emission color of the display layer 232 at predetermined intervals (for example, at each position of the power transmission coils 231) in accordance with the positional deviation of the vehicle 1 with respect to the power transmission coils 231. Since this process has been described in detail with reference to FIGS. 10A and 10B, the description will not be repeated.

On the other hand, in S54, the ECU 10 sets the display color of the power supply mat 23 on the HUD 192 in accordance with the positional deviation amount of the vehicle 1 with respect to the power transmission coils 231 (see FIG. 10C). The ECU 10 can calculate the positional deviation amount of the vehicle 1 based on the information such as the steering angle, the vehicle speed, and the acceleration of vehicle 1, and can set the display color of the power supply mat 23 in accordance with the calculated positional deviation amount. The ECU 10 may detect the light emission color of the display layer 232 of the power supply mat 23 by the camera 184 and set the display color of the power supply mat 23 on the HUD 192 in accordance with the detected light emission color. When the display layer 232 of the power supply mat 23 is blinking, the ECU 10 can also cause the display of the power supply mat 23 on the HUD 192 to blink. The ECU 10 may cause the blinking timing of the display on the HUD 192 to synchronize with the blinking timing of the display layer 232.

As described above, also in the third embodiment, the display mode of the display layer 232 of the power supply mat 23 is controlled so as to guide the vehicle 1 in accordance with the traveling state of the vehicle 1. More specifically, the display color of the display layer 232 is controlled in accordance with the positional deviation amount of the vehicle 1. Since the traveling position of the vehicle 1 deviates from the power supply mat 23 with the current vehicle operation, the driver can easily recognize that the vehicle operation needs to be changed. Thus, the vehicle 1 can travel at an appropriate position in the lateral direction on the power supply mat 23. As a result, the efficiency of the power transmission from the power supply mat 23 to the power receiving device 16 can be improved.

The embodiments disclosed herein should be considered to be exemplary and not restrictive in all respects. The scope of the present disclosure is shown by the scope of claims rather than the description of the above embodiments, and is intended to include all modifications within the meaning and the scope equivalent to the scope of claims.

What is claimed is:

1. A power transmission device comprising:
   a plurality of power transmission coils arranged in a predetermined direction on a road and configured to transmit electric power in a non-contact manner to a power receiving coil mounted on a vehicle;
   a display unit provided above the power transmission coils; and
   a control unit that controls a display mode of the display unit so as to guide the vehicle in accordance with a traveling state of the vehicle, wherein:
   when a traveling speed of the vehicle is slower than a specified speed of the road, the control unit controls the display unit such that the display unit emits light in a light emission pattern flowing in a traveling direction of the road on which the power transmission coils are installed;
   the control unit increases a speed at which the light emission pattern flows as the traveling speed of the vehicle is slower; and
   the power transmission coils are configured to transmit the electric power in the non-contact manner to the power receiving coil while the vehicle is moving on the road.

2. The power transmission device according to claim 1, wherein the control unit
   controls the display unit such that the display unit displays an icon or a message for moving the vehicle to the left when the vehicle is traveling with the power receiving coil deviated to the right with respect to the power transmission coils, and
   controls the display unit such that the display unit displays an icon or a message for moving the vehicle to the right when the vehicle is traveling with the power receiving coil deviated to the left with respect to the power transmission coils.

3. The power transmission device according to claim 1, wherein the control unit
   controls the display unit such that the display unit emits light in a first light emission color in a section where a traveling position of the vehicle is maintained on the power transmission coils, and
   controls the display unit such that the display unit emits light in a second light emission color different from the first light emission color in a section where the traveling position of the vehicle deviates from the power transmission coils.

4. A non-contact power transmission system comprising:
   the power transmission device according to claim 1; and
   the vehicle.

5. The non-contact power transmission system according to claim 4, wherein:
   the vehicle includes
   a display device that provides information to a driver of the vehicle, and
   a control device that controls the display device; and the control device controls the display device such that the display device displays a notification for adjusting a traveling position of the vehicle.

6. The non-contact power transmission system according to claim 5, wherein the notification includes an icon for improving efficiency of power transmission from the power transmission coils to the power receiving coil.

7. The non-contact power transmission system according to claim 5, wherein
the display device includes a head-up display, and
the control device controls the head-up display such that the head-up display displays the notification when the vehicle approaches the power transmission device within a predetermined distance.

8. The power transmission device according to claim 1, wherein the road is a charging road to charge the vehicle in the non-contact manner, and the specified speed of the road is a value set in advance when the power transmission coils are installed in the charging road.

9. A method for controlling a power transmission device including a plurality of power transmission coils arranged in a predetermined direction on a road and configured to transmit electric power in a non-contact manner to a power receiving coil mounted on a vehicle, the method comprising:
detecting a traveling state of the vehicle; and
guiding the vehicle by changing a display mode of a display unit provided above the power transmission coils, in accordance with the traveling state of the vehicle,
wherein:
wherein a traveling speed of the vehicle is slower than a specified speed of the road, the display unit emits light in a light emission pattern flowing in a traveling direction of the road on which the power transmission coils are installed;
a speed at which the light emission pattern flows increases as the traveling speed of the vehicle becomes slower; and
the power transmission coils are configured to transmit the electric power in the non-contact manner to the power receiving coil while the vehicle is moving on the road.

* * * * *